US010097456B2

(12) United States Patent
Korpinen et al.

(10) Patent No.: US 10,097,456 B2
(45) Date of Patent: Oct. 9, 2018

(54) METHOD AND AN APPARATUS FOR A GATEWAY

(75) Inventors: Pekka Olavi Korpinen, Espoo (FI); Juha Matti Rakkola, Espoo (FI); Michel Rene Gustave Gillet, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 190 days.

(21) Appl. No.: 13/984,143

(22) PCT Filed: Feb. 25, 2011

(86) PCT No.: PCT/IB2011/050815
§ 371 (c)(1),
(2), (4) Date: Sep. 9, 2013

(87) PCT Pub. No.: WO2012/114157
PCT Pub. Date: Aug. 30, 2012

(65) Prior Publication Data
US 2014/0314082 A1   Oct. 23, 2014

(51) Int. Cl.
*H04L 12/741*   (2013.01)
*H04L 12/721*   (2013.01)

(52) U.S. Cl.
CPC ............ *H04L 45/745* (2013.01); *H04L 45/70* (2013.01)

(58) Field of Classification Search
None
See application file for complete search history.

(56) References Cited

U.S. PATENT DOCUMENTS

| 7,428,209 B1* | 9/2008 | Roberts ......................... 370/217 |
| 7,978,728 B2* | 7/2011 | Gillet et al. .................. 370/466 |
| 8,391,289 B1* | 3/2013 | Yalagandula ....... H04L 12/2818 370/392 |
| 2003/0227925 A1* | 12/2003 | Matsuo et al. ........... 370/395.32 |
| 2005/0018670 A1* | 1/2005 | Shigematsu et al. ......... 370/389 |
| 2006/0107188 A1* | 5/2006 | Koyanagi ............... H04L 45/02 714/776 |
| 2006/0168317 A1* | 7/2006 | Charzinski et al. .......... 709/238 |

(Continued)

FOREIGN PATENT DOCUMENTS

EP   1416671   5/2004

OTHER PUBLICATIONS

International Search Report received for corresponding Patent Cooperation Treaty Application No. PCT/IB2011/050815, dated May 8, 2012, 5 pages.

(Continued)

*Primary Examiner* — Shukri Taha
*Assistant Examiner* — Manuel Rangel
(74) *Attorney, Agent, or Firm* — Locke Lord LLP (57) ABSTRACT

An apparatus comprises at least one processor and at least one memory including computer code. The at least one memory and the computer code are configured to with the at least one processor cause the apparatus to at least perform receiving a first message from a first port, the first message for transmission in a communications network. The first message comprises at least one destination address. The apparatus is also configured to perform determining whether the first message is deliverable and generating a second message comprising the at least one destination address for each undeliverable address; and transmitting the second message.

12 Claims, 7 Drawing Sheets

(56) References Cited

U.S. PATENT DOCUMENTS

| | | | |
|---|---|---|---|
| 2007/0242602 A1 | 10/2007 | Pang et al. | |
| 2008/0025203 A1 | 1/2008 | Tallet | |
| 2008/0247397 A1* | 10/2008 | Gillet et al. | 370/392 |
| 2008/0310417 A1* | 12/2008 | Friskney | H04L 12/4645 370/392 |
| 2009/0109848 A1* | 4/2009 | Hato | H04L 12/4641 370/235 |
| 2009/0296704 A1* | 12/2009 | Kim | H04L 45/20 370/389 |
| 2010/0110881 A1* | 5/2010 | Ryoo | H04L 12/42 370/225 |
| 2010/0246387 A1* | 9/2010 | Krishnan | H04L 12/437 370/225 |
| 2011/0206087 A1* | 8/2011 | Picard | G01D 4/004 375/132 |
| 2011/0235506 A1* | 9/2011 | Pao | H04L 43/0805 370/225 |
| 2011/0317700 A1* | 12/2011 | Assarpour | H04L 12/4625 370/392 |
| 2012/0075988 A1* | 3/2012 | Lu | H04L 45/02 370/218 |
| 2013/0039169 A1* | 2/2013 | Schlansker | H04L 45/04 370/225 |

OTHER PUBLICATIONS

Jian Qiu et al. "Fast Spanning Tree Reconnection for Resilient Metro Ethernet Networks", Communications, 2009. ICC'09. IEEE International Conference on, vol. No., pp. 1-5, Jun. 14-18, 2009.

Nair, P.M.V. et al. "Distributed Restoration Method for metro Ethernet", Networking, International Conference on Systems and International Conference on Mobile Communications and Learning Technologies, 2006. ICN/ICONS/MCL 2006. International Conference on, vol. No., pp. 94, Apr. 23-29, 2006.

* cited by examiner

METHOD AND AN APPARATUS FOR A GATEWAY

RELATED APPLICATION

This application was originally filed as PCT Application No. PCT/IB2011/050815 filed Feb. 25, 2011.

TECHNICAL FIELD

The present application relates to a method and an apparatus more specifically but not exclusively to an apparatus configured to communicate between two devices.

DESCRIPTION OF THE RELATED ART

Communication environments can be quite varied. For example, within a single device or entity, there may be communications between different functionalities, nodes, modules and sub-systems within that device. Alternatively, two or more devices may be connected together and there may be communications between two or more of the devices. It is known to have two devices communicating with each other via one or more other devices such as in the context of a packet data network, a mobile communications network, system area network or the like. The packet data network provides communication between communicating devices using a layer protocol for interconnecting devices, components circuits or modules such as cellular telephones, handheld computers, digital cameras multimedia devices and/or the like. Beside that external systems can also be connected to the single device or entity to enable the single device or entity to be upgradeable.

The communication network might be based on a high-speed serial physical interconnect which may support several lanes operating at rates up to several Gbit per second per lane and may use low-voltage, source-synchronous, scalable-signalling technology. On the physical interconnect a protocol stack may operate. The protocol stack defines how data is transmitted across the physical network.

Some standards and the protocols implement data integrity checks—in other words checks to determine that the data transmitted by the data originator (or first end node) of the network has been received and is being processed by a data final destination (or second end node). Where the network nodes have a limited capacity for receiving and processing data typical network protocols implement a stop or discard process.

One such network protocol implemented within electronic devices is the MIPI Unified Protocol (UniPro) system which defines the components that wish to communicate as devices or nodes of a network. Multiple components or devices are in turn coupled to the network by way of gateway devices or switches. Communication across the network is performed by routing packets from the originating device between the gateway devices and to the addressed device.

However there can be problems in such networks where devices fail or where couplings between devices fail. In such situations, packets may not contain information defining the originating device and allow further packets to be sent without reaching the same unreachable addressed device. This uses up network capacity without any expectation of success.

Although network protocols such as internet protocol (IP) can overcome such problems by incorporating within a packet the originating address, this solution requires the network to contain additional layers of protocol for packet handling. This therefore complicates the network and requires additional network overhead both in network capacity and packet processing.

SUMMARY

Various aspects of the invention are set out in the claims.

There is provided according to a first aspect of the application a method comprising: receiving a first message from a first port, the first message for transmission in a communications network, the first message comprising at least one destination address; determining whether the first message is deliverable; generating a second message comprising the at least one destination address for each undeliverable address; and transmitting the second message.

Transmitting the second message may comprise transmitting the second message on the first port.

Transmitting the second message may comprise transmitting the second message on every port.

Transmitting the second message may comprise transmitting the second message to each port coupled to a peer device.

Determining whether the first message is deliverable may comprise: determining from a routing table at least one port associated with the at least one destination address.

The first message may be a data message.

The second message may be a control message.

According to a second aspect of the application there is provided a method comprising: receiving a first message from a network via at least one port, the first message comprising at least one address identifier; removing an association in a routing table between the at least one address identifier and the at least one port.

The first message may be at least one of: a control message; and a notification message.

The method may comprise transmitting a second message for transmission in a communications network via a first port, the second message comprising at least one destination address, and wherein the first message is received via the first port in response to the second message being determined as being undeliverable.

Removing an association in a routing table between the at least one address identifier and the at least one port may comprise at least one of: deleting the routing table entry associated with the at least one address identifier; and amending the routing table entry associated with the at least one address identifier such that the routing table entry is a null field.

The method may comprise closing all connections to the device associated with the at least one address identifier.

In a third aspect of the application there is an apparatus comprising at least one processor and at least one memory including computer code, the at least one memory and the computer code configured to with the at least one processor cause the apparatus to at least perform: receiving a first message from a first port, the first message for transmission in a communications network, the first message comprising at least one destination address; determining whether the first message is deliverable; generating a second message comprising the at least one destination address for each undeliverable address; and transmitting the second message.

Transmitting the second message may cause the apparatus to perform transmitting the second message on the first port.

Transmitting the second message may cause the apparatus to perform transmitting the second message on every port.

Transmitting the second message may cause the apparatus to perform transmitting the second message to each port coupled to a peer device.

Determining whether the first message is deliverable may cause the apparatus to perform determining from a routing table at least one port associated with the at least one destination address.

In a fourth aspect of the application there is an apparatus comprising at least one processor and at least one memory including computer code, the at least one memory and the computer code configured to with the at least one processor cause the apparatus to at least perform: receiving a first message from a network via at least one port, the first message comprising at least one address identifier; removing an association in a routing table between the at least one address identifier and the at least one port.

The apparatus may be configured to perform: transmitting a second message for transmission in a communications network via a first port, the second message comprising at least one destination address, and wherein the first message is received via the first port in response to the second message being determined as being undeliverable.

Removing an association in a routing table between the at least one address identifier and the at least one port may comprise at least one of: deleting the routing table entry associated with the at least one address identifier; and amending the routing table entry associated with the at least one address identifier such that the routing table entry is a null field.

The apparatus may be configured to perform closing all connections to the device associated with the at least one address identifier.

In a fifth aspect of the application there is provided an apparatus comprising: a receiver configured to receive a first message from a first port, the first message for transmission in a communications network, the first message comprising at least one destination address; a delivery determiner configured to determine whether the first message is deliverable; a message generator configured to generate a second message comprising the at least one destination address for each undeliverable address; and a transmitter configured to transmit the second message.

The transmitter may comprise a port selector configured to transmit the second message on the first port.

The transmitter may comprise a port selector configured to transmit the second message on every port.

The transmitter may comprise a port selector configured to transmit the second message to each port coupled to a peer device.

A delivery determiner may comprises: a routing table comprising a list of ports associated with device addresses; a routing table lookup configured to determine whether the routing table comprises an entry associated with the at least one destination address.

In a sixth aspect of the application there is provided an apparatus comprising: a receiver configured to receive a first message from a network via at least one port, the first message comprising at least one address identifier; a de-associater configured to removing an association in a routing table between the at least one address identifier and the at least one port.

A transmitter may be configured to transmit a second message for transmission in a communications network via a first port, the second message comprising at least one destination address, and wherein the first message is received via the first port in response to the second message being determined as being undeliverable.

The de-associator may comprise at least one of: a deleter configured to delete the routing table entry associated with the at least one address identifier; and an amender configured to amend the routing table entry associated with the at least one address identifier such that the routing table entry is a null field.

The apparatus may comprise a connection closer configured to close all connections to the device associated with the at least one address identifier.

In a seventh aspect of the application there is provided a computer program, comprising: code for receiving a first message from a first port, the first message for transmission in a communications network, the first message comprising at least one destination address; code for determining whether the first message is deliverable; code for generating a second message comprising the at least one destination address for each undeliverable address; and code for transmitting the second message; when the computer program is run on a processor.

Code for transmitting the second message may comprise code for transmitting the second message on the first port.

Code for transmitting the second message may comprise code for transmitting the second message on every port.

Code for transmitting the second message may comprise code for transmitting the second message to each port coupled to a peer device.

Code for determining whether the first message is deliverable may comprise code for determining from a routing table at least one port associated with the at least one destination address.

In an eighth aspect of the application there is provided a computer program comprising: code for receiving a first message from a network via at least one port, the first message comprising at least one address identifier; and code for removing an association in a routing table between the at least one address identifier and the at least one port; when the computer program is run on a processor.

The computer program may comprise code for transmitting a second message for transmission in a communications network via a first port, the second message comprising at least one destination address, and wherein the first message is received via the first port in response to the second message being determined as being undeliverable.

Code for removing an association in a routing table between the at least one address identifier and the at least one port may comprise at least one of: code for deleting the routing table entry associated with the at least one address identifier; and code for amending the routing table entry associated with the at least one address identifier such that the routing table entry is a null field.

The computer program may comprise code for closing all connections to the device associated with the at least one address identifier.

In a ninth aspect of the application there is provided an apparatus comprising: means for receiving a first message from a first port, the first message for transmission in a communications network, the first message comprising at least one destination address; means for determining whether the first message is deliverable; means for generating a second message comprising the at least one destination address for each undeliverable address; and means for transmitting the second message.

The means for transmitting the second message may comprise means for transmitting the second message on the first port.

The means for transmitting the second message may comprise means for transmitting the second message on every port.

The means for transmitting the second message may comprises means for transmitting the second message to each port coupled to a peer device.

The means for determining whether the first message is deliverable may comprise: means for determining from a routing table at least one port associated with the at least one destination address.

In a tenth aspect of the application there is provided an apparatus comprising: means for receiving a first message from a network via at least one port, the first message comprising at least one address identifier; and means for removing an association in a routing table between the at least one address identifier and the at least one port.

The apparatus may comprises: means for transmitting a second message for transmission in a communications network via a first port, the second message comprising at least one destination address, and wherein the first message is received via the first port in response to the second message being determined as being undeliverable.

The means for removing an association in a routing table between the at least one address identifier and the at least one port may comprise at least one of: means for deleting the routing table entry associated with the at least one address identifier; and means for amending the routing table entry associated with the at least one address identifier such that the routing table entry is a null field.

The apparatus may comprise means for closing all connections to the device associated with the at least one address identifier.

Embodiments of the present application aim to address the above problems.

BRIEF DESCRIPTION OF THE DRAWINGS

For better understanding of the exemplary embodiments of the application, reference will now be made by way of example to the accompanying drawings in which.

DETAILED DESCRIPTION

The exemplary embodiments of the present application relate but not exclusively to network architectures in a user equipment. These embodiments of the application may be applicable to other user equipment networks for connecting elements or modules within user equipment or any other types of electronic devices.

For example in some embodiments the electronic device or apparatus within which the embodiments of the application can be found can be a personal computer, a portable personal computer such as a laptop or tablet computer, a personal audio player or recorder (also known as mp3 players), a personal video player or recorder (also known as mp4 players), a camera, or a media device (an electronic device which as capable of handling many different media).

Figure 1:
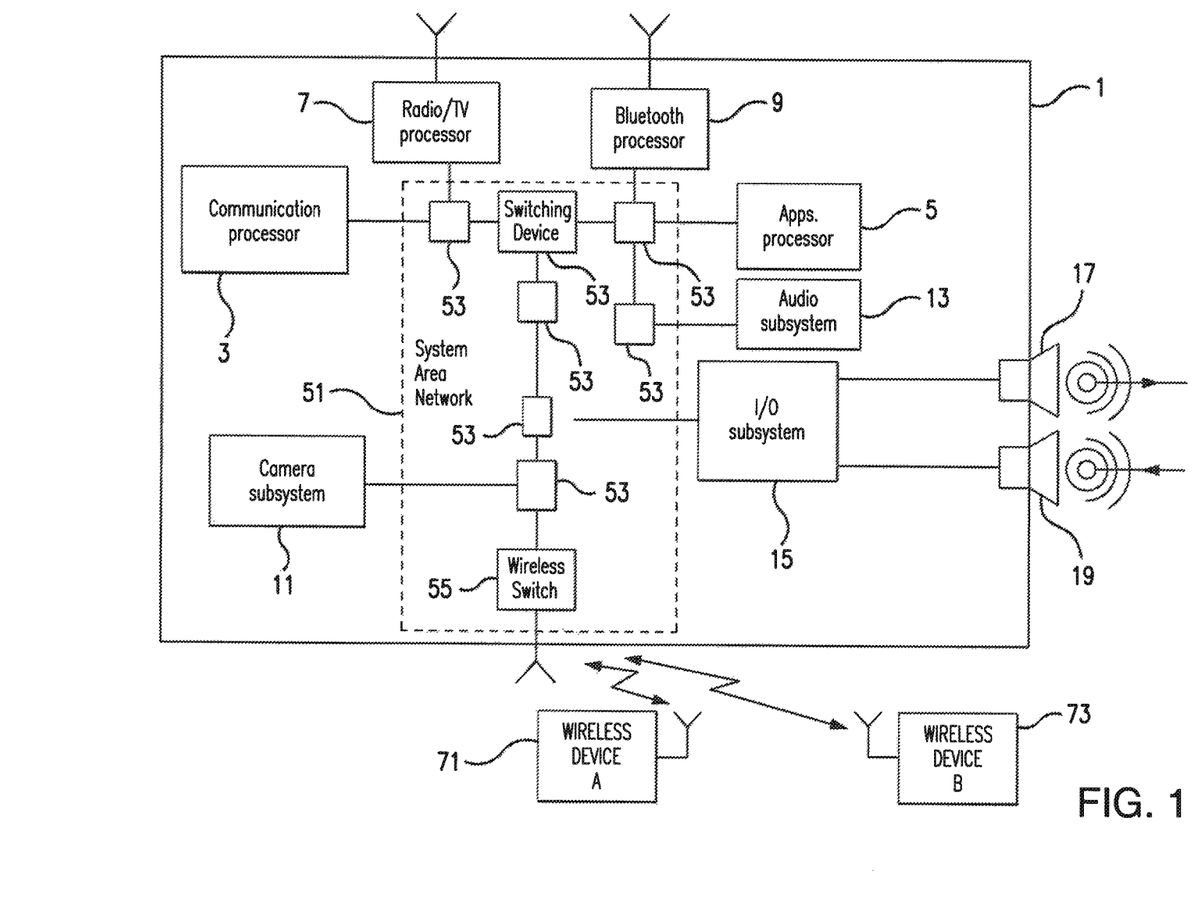
FIG. 1 shows a schematic view of a system area network over which exemplary embodiments of the application can be implemented.

Reference is made to FIG. 1 which shows a schematic view of a system area network comprised in such an electronic device 1. The electronic device 1 comprises several components/sub-systems or devices connected or coupled together via a wired network 51. For clarity components of the electronic device 1 not directly concerned with the present application are not shown.

The system area network 51 comprises a series of nodes or switching devices 53 which act as switches or routers for receiving and distributing packets from an end to end originating device to an end to end addressed device. These end to end originating and addressed devices can be the components/sub-systems or devices described herein.

The system area network 51 therefore can couple or connect a series of processors, sub-systems, modules or generally devices to carry out various processes or applications associated with the user equipment or electronic device. For example as shown in FIG. 1, the system area network 51 is connected to a communications processor 3 (for communicating with the cellular network), an applications processor 5 (arranged to controlling the operation of applications), a radio/TV processor 7 (arranged to receive either analogue/digital radio/TV signals), a Bluetooth processor 9 (arranged to receive and transmit Bluetooth data over a Bluetooth communications channel), a camera sub-system 11 arranged to receive and transmit digital image data from the camera (the camera in some embodiments be connected to the system area network and transmit raw data to the camera sub-system 11), an audio sub-system 13 (arranged to transmit audio data for example MP3 audio data), and a I/O sub-system 15 connected to the earpiece/speaker 17 and/or the microphone 19. These processors/sub-systems described are examples only and some embodiments of the present application can in some embodiments have more or fewer sub-systems connected to the system area network 51. Furthermore in some embodiments at least one sub-system is connected to the system area network 51 via an external connection not shown in FIG. 1.

In system area networks point-to-point (P2P) flow control may be used to guarantee reliability and packet integrity between nodes on link level (between two neighbouring nodes or devices). Additional end-to-end flow (E2E) can in some embodiments be used to guarantee reliability and packet integrity between end nodes in a system area network 51.

Figure 2:
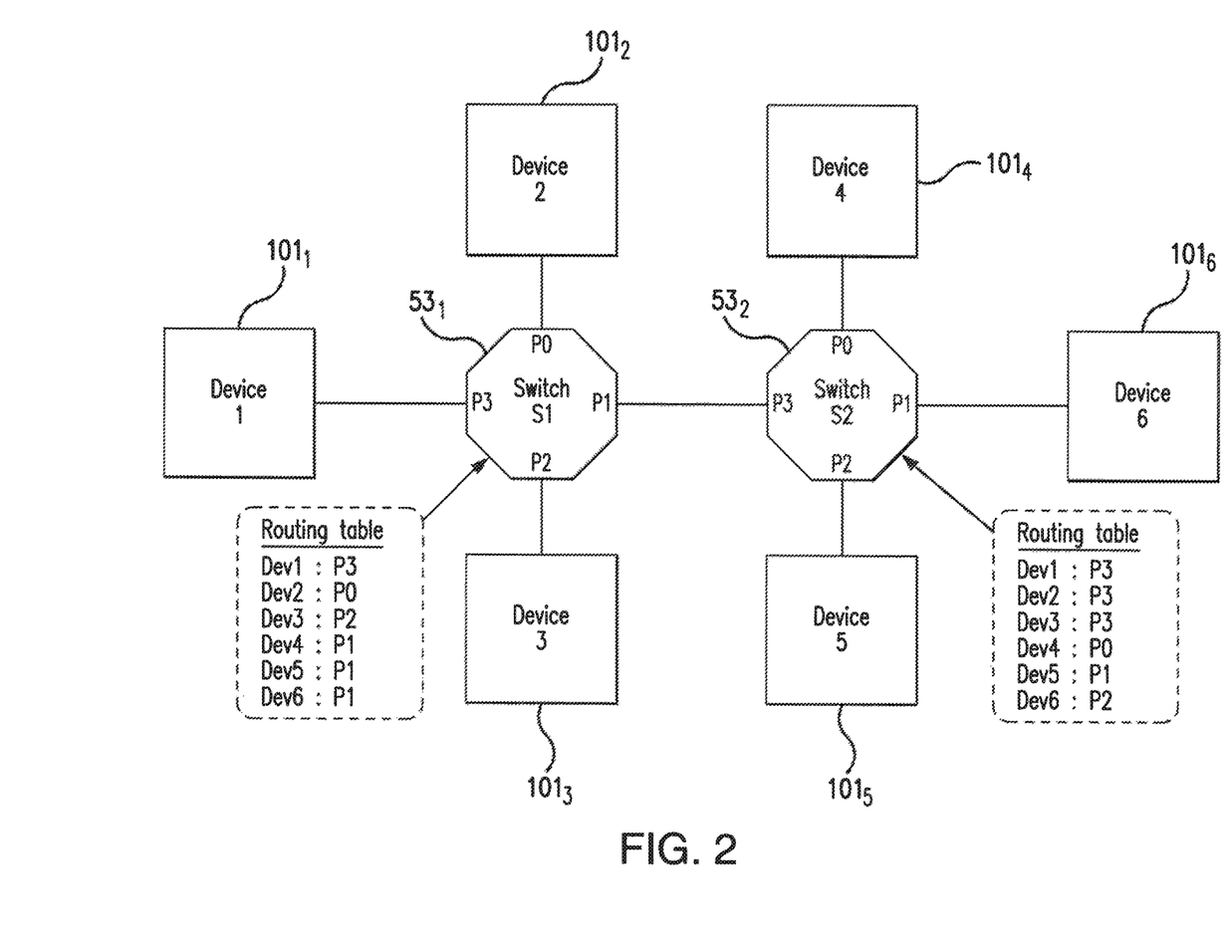
FIG. 2 shows a schematic view of a generic system area network according to some embodiments.

The electronic device 1 furthermore in some embodiments can comprise a wireless switch 55 which is connected or coupled to at least one wired node. For example as shown in FIG. 2 the wireless switch 55 is coupled via a wired connection to the system area network 51 and furthermore is configured to communicate to wireless devices via a wireless connection. The wireless devices are shown in FIG. 1 as wireless device A 71 and wireless device B 73. It would be appreciated that each wireless device may itself contain a system area network with one or more nodes or devices.

In some embodiments a coupling or link between electronic devices using the system area network can be performed by any suitable link or coupling, for example any suitable communication link such as a USB coupling can be implemented to form a bridge between device system area networks.

With respect to FIG. 2 a generic example of a system area network comprising switches 53 is shown permitting communication between devices 101. In the example shown in FIG. 2 six devices 101 are shown coupled together with two switches. It would be understood that the topology of the network shown and described herein is for example only and the electronic device could comprise any number of switches arranged in any suitable topological arrangement.

In the embodiments of the application each device 101 comprises a single port through which packets can be output and received. It would however be understood that in some embodiments a device can comprise any suitable number of ports. For example in some embodiments a device could comprise more than one port to allow redundancy (for example to allow connectivity in case of coupling failure) or to permit additional data flow capacity.

Each device can represent for example any of the following systems or sub-systems of the electronic device or apparatus 1 such as the communications processor 3 (or radio frequency engine for communicating with the cellular network), the applications processor 5 (arranged to control the operation of applications), a radio/TV processor 7 (arranged to receive either analogue/digital radio/TV signals), a Bluetooth or low power radio frequency processor 9 (arranged to receive and transmit Bluetooth data over a Bluetooth communications channel or any other suitable low power radio frequency communications system), a camera sub-system 11 (arranged to receive and transmit digital image data from the camera which in some embodiments can be connected to the system area network and transmit raw data to the camera sub-system 11), an audio sub-system 13 (arranged to transmit audio data for example MP3 audio data), and a I/O sub-system 15 (for example connected to the earpiece/speaker 17 and/or the microphone 19).

Furthermore the system area network shown in FIG. 2 comprises a first switch $53_1$ configured with four ports for communicating. Each port as described herein represents a point-to-point packet data connection and as such couples the switch to a further device or switch. In the example shown in FIG. 2, the first switch $53_1$ comprises a first port P0 which is configured to couple the first switch $53_1$ to the second device $101_2$, a second port P1 which is configured to couple the first switch $53_1$ to the second switch $53_2$, a third port P2 which is configured to couple the first switch $53_1$ to the third device $101_3$ and a fourth port P3 which is configured to couple the first switch $53_1$ to the first device $101_1$.

Furthermore the system area network shown in FIG. 2 comprises a second switch $53_2$ configured also with four ports for communicating. The second switch $53_2$ comprises a first port P0 which is configured to couple the second switch $53_2$ to the fourth device $101_4$, a second port P1 which is configured to couple the second switch $53_2$ to the sixth device $101_6$, a third port P2 which is configured to couple the second switch $53_2$ to the fifth device $101_5$ and a fourth port P3 which is configured to couple the second switch $53_2$ to the first switch $53_1$.

It would be further understood that although the switches as shown and described as having four ports it would be understood that in some embodiments each switch can comprise more or fewer than four ports. Furthermore although in the examples described herein the ports are two way or bi-directional couplings it would be understood that in some embodiments the port defines a one way or uni-directional flow of packet data.

Figure 3:
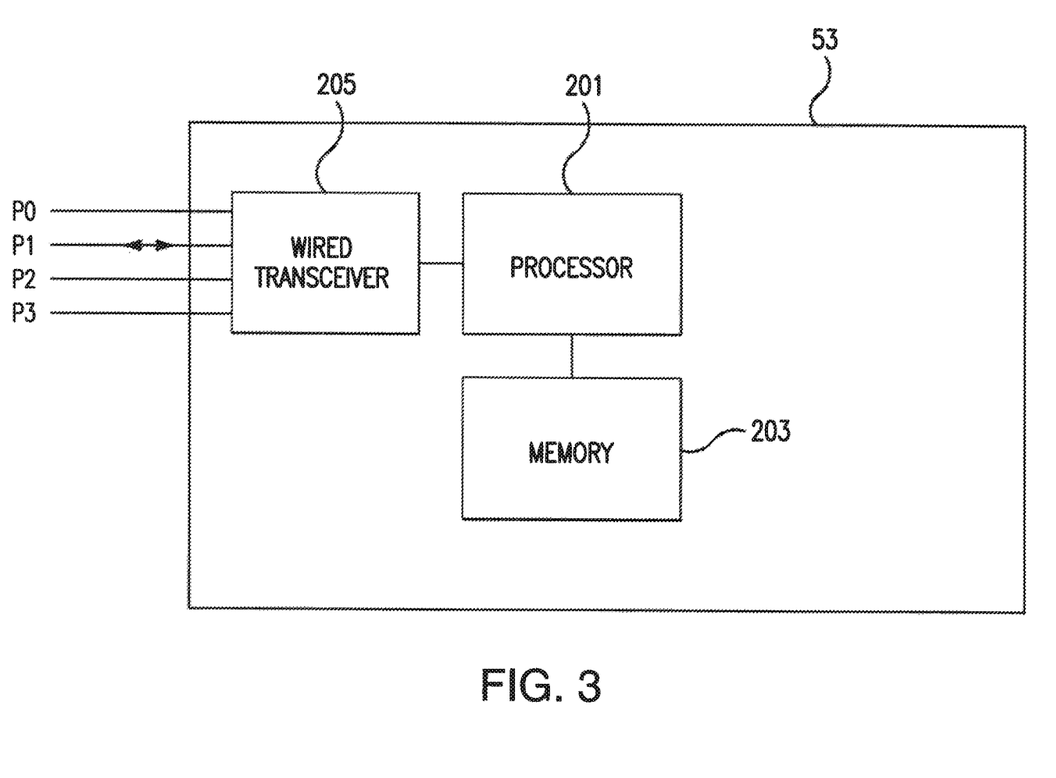
FIG. 3 a schematic view of a device within the generic system area network according to some embodiments.

With respect to FIG. 3, the switch 53 is shown in further detail. The switch 53 comprises in some embodiments a wired transceiver 205. The wired transceiver 205 is configured to receive the various port connections or couplings, for example as shown in FIG. 3 the four port switch configuration shown in FIG. 2 is shown in further detail whereby the first port P0, the second port P1, the third port P2, and the fourth port P3 are each coupled to the wired transceiver 205. The wired transceiver 205 can be configured to receive packets from each of the ports, and furthermore to transmit packets to each of the ports. In some embodiments the wired transceiver 205 comprises a reconfigurable switch arrangement controlled by the processor 201.

In some embodiments the switch 53 further comprises a processor 201. The processor 201 can in some embodiments be configured to perform various program codes. The implemented program codes can comprise code for handling and processing data received at the switch and further comprise code for controlling the wired transceiver 205 for communicating. The program code can in some embodiments be stored for example in the memory 203 for retrieval by the processor 201 whenever needed.

The switch 53 can further comprise memory 203. The memory can in some embodiments provide further a section for storing the received packet data, for example data that is being processed by the processor 201. The program code can, in some embodiments, be implemented completely in hardware or firmware.

In some embodiments the memory 203 can further comprise a routing table. The routing table can be a simple look-up table with devices associated with a port or vice versa. The routing table within the memory can be used by the processor for controlling the wired transceiver 205. Thus when the switch receives a packet to be sent onwards through the network, the packet comprising an address or addressing identification part, the processor 201 can look-up the destination address or device address within the routing table and from the routing table determine the port the wired transceiver 205 is to use to output the packet. The routing table can in some embodiments be a table with lists, where each entry on the list comprises a device linked to or associated with a port number. In some further embodiments the list can further comprise additional information on each entry such as whether the port is coupled to the same type of device, in other words whether the port is coupled to a peer.

Thus the processor 201 can in some embodiments identify to which port the packet is to be forwarded and configure the wired transceiver 205 to output the packet on the correct port.

As can be seen in FIG. 2, the first switch $53_1$ comprises a routing table whereby device 1 is linked to the fourth port P3, device 2 is linked to the first port P0, device 3 is linked to the third port P2, and the fourth, fifth and sixth devices are linked to the second port P1, in other words are not directly coupled to the first switch but via the second switch. Similarly, with respect to the second switch the routing table shown in FIG. 2 for the second switch associates the first, second and third devices with the fourth port of the second switch P3, the fourth device with the first port P0, the fifth device with the second port P1 and the sixth device with the third port P2.

Figure 4:
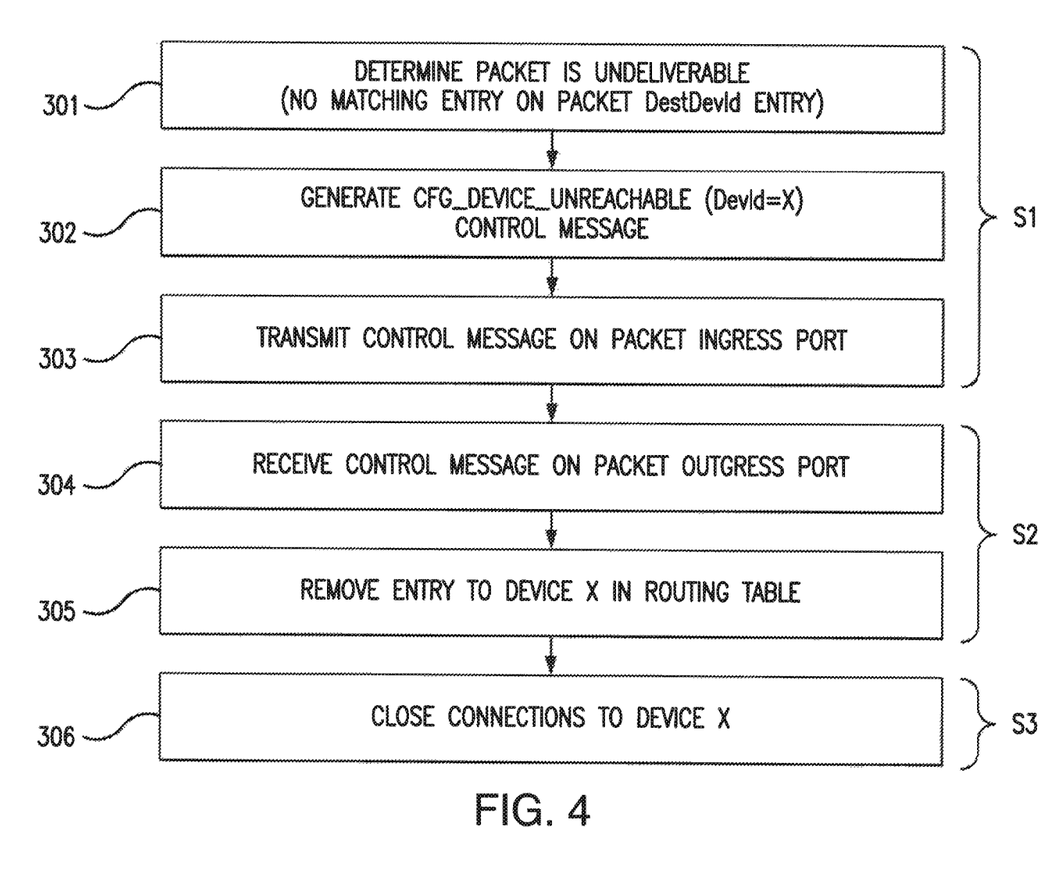
FIG. 4 shows a flow diagram of the operation of a device according to some embodiments.

With respect to FIG. 4, the operation of the switch 53 according to some embodiments of the application is shown where for example the switch 53 is unable to deliver a packet message.

The processor 201, or delivery determiner, or means for determining delivery, can on receiving a packet perform a delivery check. For example the processor 201 can in some embodiments examine the memory 203 to determine whether or not there is a matching or associated entry in the routing table which matches the packet or destination address information. For example, in some embodiments, the packet address information is a DestDevId entry.

Where there is a matching entry then the processor 201 can determine that the packet is deliverable and as described herein control the wired transceiver 205 to output the packet and message payload via the associated port to a further switch or device.

Where there is no matching or associated entry then the processor 201 determines that the packet or message is undeliverable. A lack of a matching entry can be generated previously, for example, where a previous packet is undelivered or no response from the port is received.

The determination that the packet is undeliverable operation is shown in FIG. 4 by step 301.

The processor 201, or message generator, or means for generating a message can then in some embodiments generate a control or notification message to identify that the device has been determined as being unreachable. In some embodiments the processor 201 can thus generate a CFG_Device_Unreachable for a specific device identifier (in this case the DevId=X).

The generation of such a control or notification message can be seen in FIG. 4 by step 302.

Furthermore in some embodiments the processor 201 can then control the wired transceiver 205 or transmitter to pass or transmit the control or notification message on the same port that the incoming or originally received packet was received on. In other words the wired transceiver 205 under control of the processor 201 can transmit the control message on the packet ingress port.

The operation of transmitting the control message on the packet ingress port shown in FIG. 4 by step 303.

The first three steps can be considered to be a single operation switch response step S1, whereby the switch determines that the received packet is undeliverable and responds to the received packet with a control message indicating this fact.

In some embodiments the control or notification message can be received at the switch or device which in some embodiments sent the original packet deemed to be undeliverable to the switch, on the packet output or outgress port. The control or notification message contains, for example, the device or destination address identifier for the unreachable device.

The operation of receiving the control or notification message from the switch on the packet output port is shown in FIG. 4 by step 304.

The device which receives the control message can then, in response to the notification or control message, remove from the routing table stored in the device the entry to the destination or addressed device indicated in the control message (in this example device X).

The operation of removing the entry to device X in the routing table is shown in FIG. 4 by step 305.

These two steps within the device receiving the notification or control message from the switch, can be seen to be a notification response step S2 as shown in FIG. 4.

Furthermore the switch can then control the further transmission of packets or messages by closing the connection to the addressed or destination device to which the initial packet has been deemed to be undeliverable.

The closing of the connection to the device X is shown in FIG. 4 by step 306.

The operation of the closing the connections to the device X is shown as a further step S3.

Figure 5:
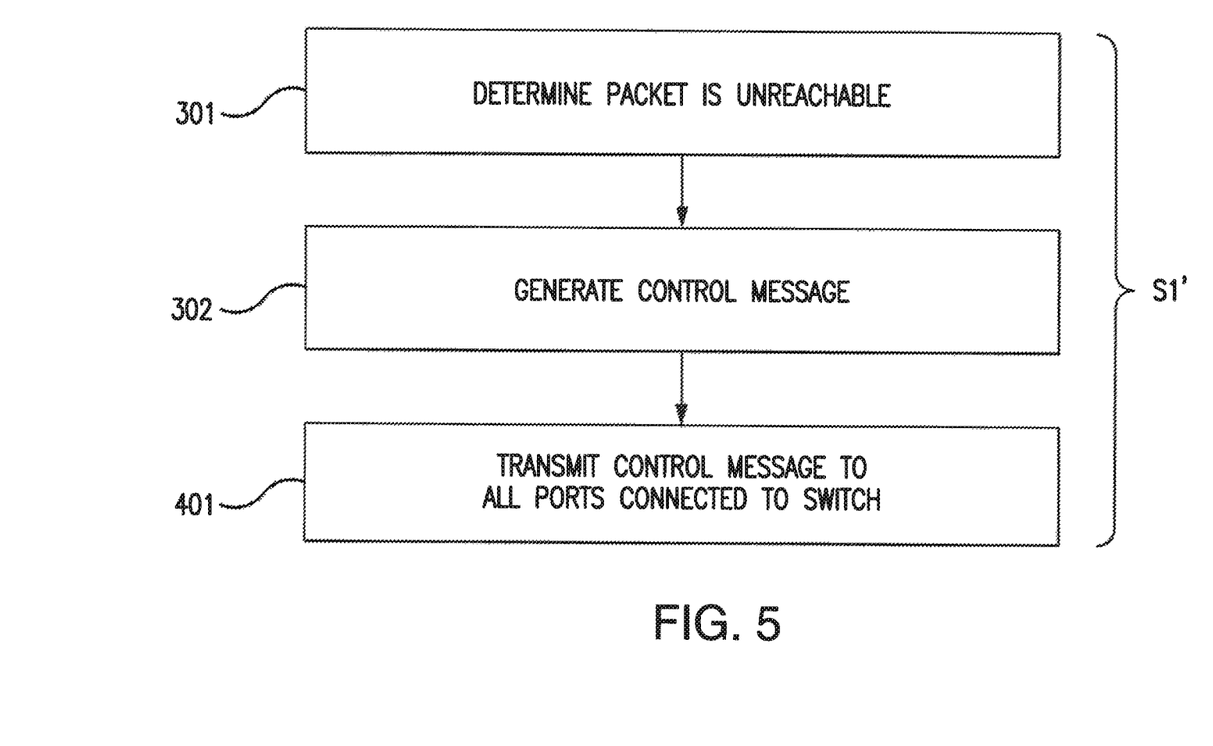
FIG. 5 shows a further flow diagram of the operation of the device showing some further embodiment operations.

With respect to FIG. 5 a further series of operations with respect to the switch 53 is shown. The operations shown in FIG. 5 describe only the operations with respect to the initial single operation step S1 determining that the packet address or destination address is unreachable and the response to this determination. In such embodiments, the remainder of the steps such as S2 and S3 implemented within the device which receives the control or notification message can be in some embodiments implemented in the same manner as described with respect to the operations shown in FIG. 4.

With respect to FIG. 5, the processor 201 on receiving a packet to be forwarded determines whether or not the packet is unreachable or reachable. As described previously, this can in some embodiments be determined by whether or not the packet or message received contains an address which has an entry in the routing table. Where no routing table entry is found then the processor 201 can determine that the packet address is unreachable.

This determination of the message address or destination being unreachable can be seen for example in FIG. 5 by step 301.

Furthermore the processor 201 on determining that the packet or message address is unreachable can generate a control or notification message in the same manner as described previously containing the device identifier of the device to which the packet has been determined to be undeliverable.

The operation of generating the control message is shown in FIG. 5 by the step 302.

However in some embodiments the processor 201 can control the wired transceiver 205 to output the control or notification message to all ports connected to the switch. This would for example rapidly propagate the control or notification message not only backwards along the initial packet direction but also to other devices and thus help to prevent other devices from sending packets which cannot be delivered.

The operation of transmitting control messages to all ports connected to the switch is shown in FIG. 5 by step 401.

The operations of determining whether a packet or message address is unreachable or undeliverable, generating a control or notification message when a packet has been determined to be unreachable, and transmitting the control message to all ports connected or coupled to the switch can be seen as being a modified S1 step which is shown in FIG. 5 as S1'.

Figure 6:
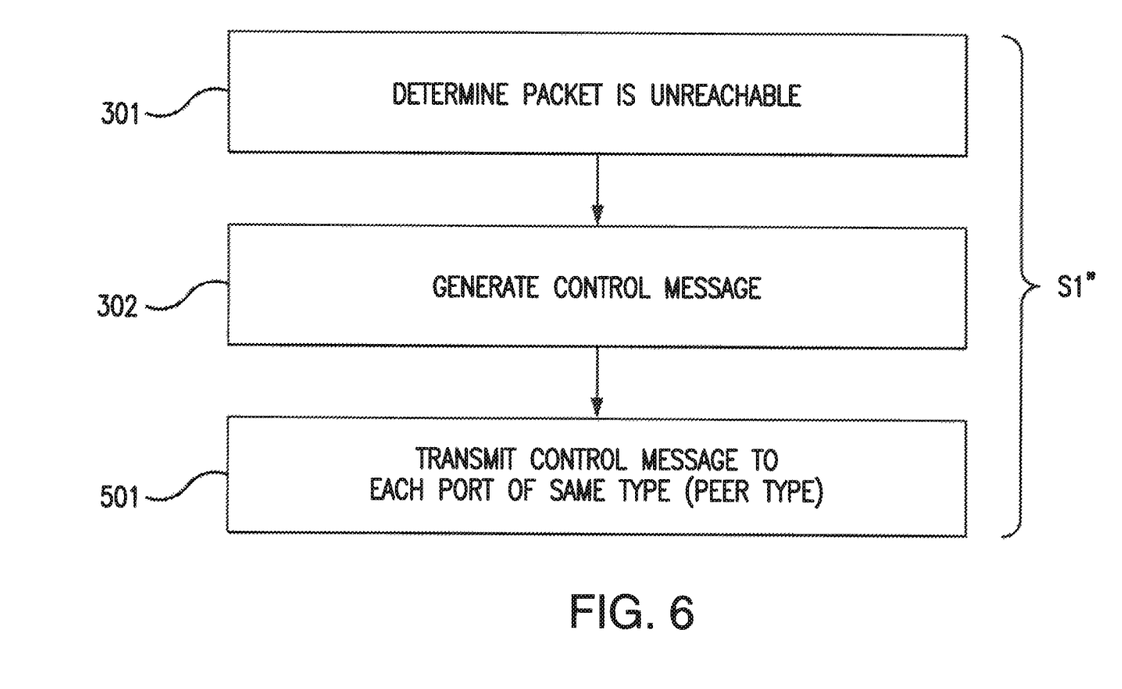
FIG. 6 shows an additional flow diagram of the operation of the device showing some embodiment operations.

With respect to FIG. 6 a further example of the operation of the switch 53 according to some embodiments of the application is shown. The difference between the operations for response step 1 or S1 between the examples shown with respect to FIG. 4 and FIG. 5 is that the processor 201, having generated a control or notification message in response to determining that the packet address or destination is unreachable, controls the wired transceiver 205 to output the control message to each port which is coupled to a device of the same type as the current device.

The 'peer' type filtering transmission operation is shown in FIG. 6 by step 501.

Thus in such embodiments the switch would only transmit a control message to further switches and a device would send a message only to another device.

The peer-to-peer control or notification message operation can as a whole be seen as being a modified response step or S1 is shown in FIG. 6 as S1".

Figure 7:
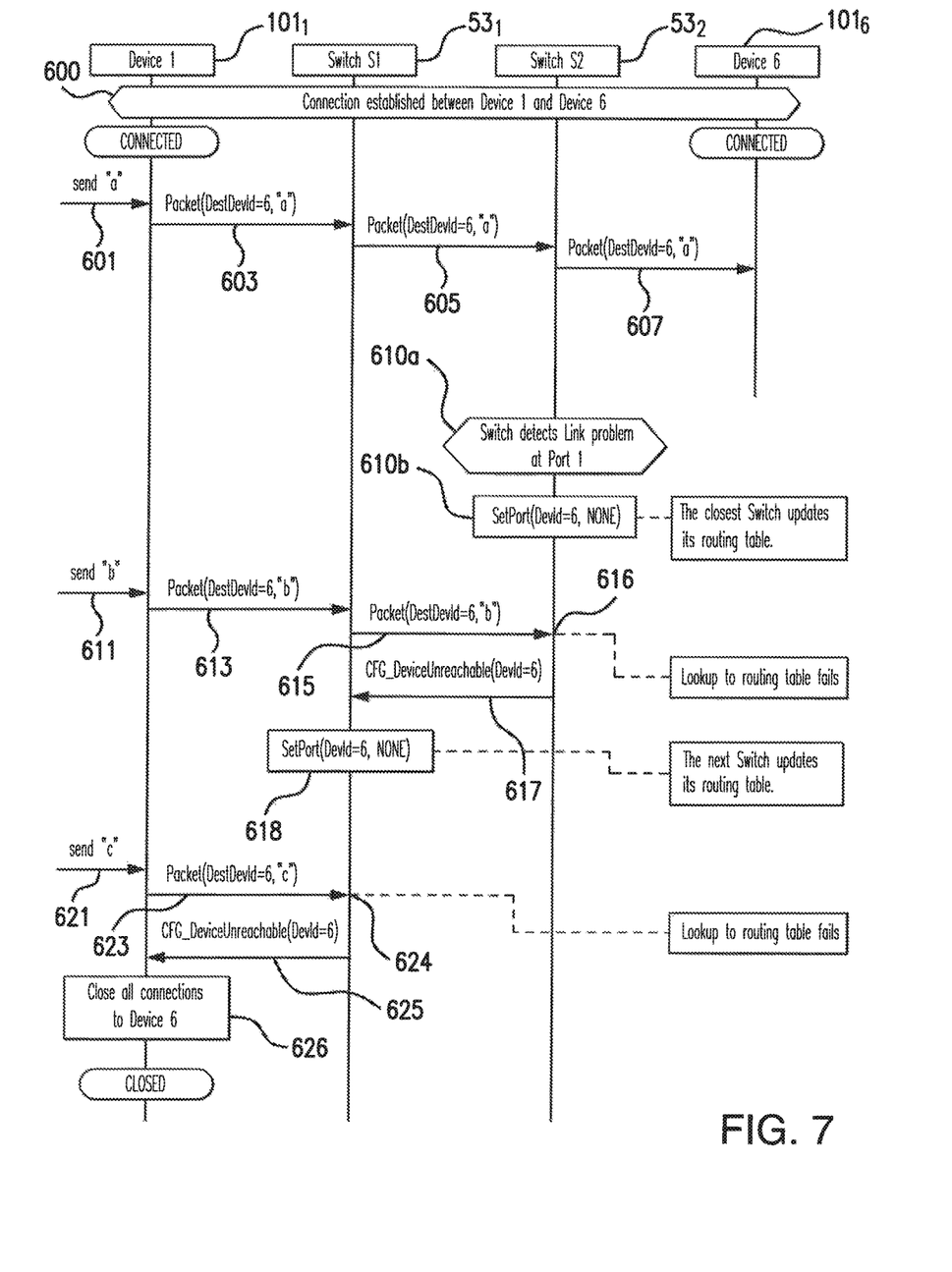
FIG. 7 shows a schematic network operation data flow diagram showing the operation of the network according to some embodiments.

With respect to FIG. 7 an example operation of a system area network according to these embodiments is shown. The system area network with respect to this example is fully described by the first device $101_1$, the first switch $53_1$, the second switch $53_2$ and the sixth device $101_6$. At some point a connection can be established between device 1 and device 6 and shown for example by the connection 600.

At some point a packet may be sent from the first device to the sixth device. Thus the first device generates a first message "a" which it wishes to send to the sixth device.

The operation of generating the first message "a" is shown in FIG. 7 as step 601. The first device $101_1$ can then send the first message "a" with a destination device identifier with a value of 6, indicating that the addressed packet is to be received finally at the sixth device and containing the message "a".

The device 1 is as shown in FIG. 2 coupled to the first switch and passes the packet to the first switch as shown in FIG. 7 as step 603.

The first switch $53_1$, receives the packet and determines from the routing table that the packet is to be forwarded onto the second port P1 to the second switch $53_2$. The first switch then controls the wired transceiver 205 to output the packet with the destination device identifier being equal to 6 and the message "a" to the second switch.

The transmission of the packet comprising the first message between the first and second switches is shown in FIG. 7 by step 605.

The second switch having received the packet with the destination device identifier 6 uses the second switch routing table to determine that the packet should then be output on the second port P1 to the sixth device $101_6$.

The transmitting or passing of the packet from the second switch to the sixth device is shown in step 607.

This as described previously is the method according to embodiments of the application for which packets can be sent across the system area network.

At some point in this example the second switch detects or determines a link problem at the second port P1. The detection of the link problem at port P1 is shown in FIG. 7 by step $610_a$.

The second switch $53_2$ can for example detect or determine a link problem, for example where the routing table has a device value associated with a null or zero port value or removed from the list completely. For example in the example shown in FIG. 7 the processor 201 can operate a program such as SetPort(DevID, port_number) where DevID is the device which is unreachable and the port_number is set to none or 0 which updates the routing table in the switch closest to the link problem to 'remove' the association between the device and the port. In this example the command run could be SetPort(DevId=6,None)

The operation of rewriting the routing table in the switch or device closest to the line problem is shown in FIG. 7 by step $610_b$.

The first device $101_1$ can for example at some point generate a second message "b" which is also to be sent to the sixth device $101_6$. However unknown to the first device $101_1$ there is currently no active coupling between the first device and the sixth device. However according to some embodiments of the application the system area network can be alerted to any problems within the network by the use of the control or notification messages.

The generation of the second message "b" is shown in FIG. 7 by step 611.

The second message "b" is transmitted between the first device and the first switch within a packet with a destination device identifier DestDevId=6 value as shown in step 613.

The first switch S1 $53_1$ having received the packet and using the routing table information forwards the packet comprising the second message "b" to the second switch $53_2$ as shown in step 615.

However at the second switch $53_2$ the routing table look-up fails as shown in step 616 due to the lack of an entry due to the earlier link problem or device failure.

In response to this look-up failure, in other words having determined at the second switch that the message destination device is unreachable and the message is therefore undeliverable the second switch $53_2$ generates a control or notification message, for example a CFG_device_unreachable (DevId=6), with the device ID of the sixth device and passes or transmits this message back along the same port from which the message was received. In other words sending the notification or control message from the second switch $53_2$ to the first switch $53_1$.

The operation of sending this control message back from the second switch to the third switch is shown in FIG. 7 by step 617.

The first switch $53_1$ having received the control or notification message can then update the routing table to delete the association between the sixth device and the port currently stored for the sixth device.

This for example is shown in FIG. 7 in step 618 where the first switch $53_1$ runs or operates a SetPort(DevID=6,None) command where the device ID DevID=6 is associated with the value of zero or null.

Thus for every further message sent the notification or control message is passed further back towards the source of any messages. For example when the first device $101_1$ generates a third message "c" such as shown in step 621 and then transmits the third message in a packet to the first switch as shown in FIG. 7 by step 623, when the first switch $53_1$ receives the packet it is unable to determine an output port in the routing table associated with the destination device and thus further generates a control message back to the first device $101_1$ as shown in step 625. The first device then can close all connections to the sixth device and thus stop attempting to send messages to the sixth device and using network resources as shown in step 626.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto.

While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments of this invention may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples. The processor or processors in some embodiments of the invention may be application specific integrated circuits (ASIC) or any form of data processing arrangement. For example the processors may be implemented using custom integrated circuit implementations, or using field programmable gate arrays (FPGA) or any technology using sea-of-gates configurations.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method comprising:
receiving a first message from a network at a first port of a first node, the first node comprising a plurality of ports configured to be coupled to a plurality of devices, the first message comprising at least one address identifier, wherein the first message indicates that a device corresponding to the at least one address identifier was determined unreachable;
removing an association in a routing table between the at least one address identifier and the first port, the routing table comprising a list of entries, each entry associating a device with at least one of the plurality of ports and including information as to whether the associated device is of the same type as the first node; and
transmitting a second message, for transmission in a communications network, only to each port of the plurality of ports which is coupled to a device of the same type as the first node, the second message comprising the at least one address identifier,
wherein removing an association in a routing table between the at least one address identifier and the first port allows messages related to other addresses to continue to be communicated through the first port.

2. The method as claimed in claim 1, wherein removing an association in a routing table between the at least one address identifier and the at least one port further comprises at least one of:
deleting the routing table associated with the at least one address identifier; or
amending the routing table entry associated with the at least one address identifier such that the routing table entry is a null field.

3. The method as claimed in claim 1, further comprising closing all connections to the device associated with the at least one address identifier.

4. The method as claimed in claim 1, wherein the first message is at least one of:
a control message; or
a notification message.

5. An apparatus comprising:
a processor and a memory including computer program code, the memory and the computer program code configured to, with the processor, cause the apparatus to:
receive a first message from a network at a first port of a first node, the first node comprising a plurality of ports configured to be coupled to a plurality of devices, the first message comprising at least one address identifier, wherein the first message indicates that a device corresponding to the at least one address identifier was determined unreachable;
remove an association in a routing table between the at least one address identifier and the first port, the routing table comprising a list of entries, each entry associating a device with at least one of the plurality of ports and including information as to whether the associated device is of the same type as the first node; and
transmit a second message, for transmission in a communications network, only to each port of the plurality of ports which is coupled to a device of the same type as the first node, the second message comprising the at least one address identifier,
wherein removing an association in a routing table between the at least one address identifier and the first port allows messages related to other addresses to continue to be communicated through the first port.

6. The apparatus as claimed in claim 5, wherein the first message is at least one of:
a control message; or
a notification message.

7. The apparatus as claimed in claim 5, wherein the memory and the computer program code are further configured to, with the processor, cause the apparatus to perform at least one of:
delete the routing table entry associated with the at least one address identifier; or
amend the routing table entry associated with the at least one address identifier such that the routing table entry is a null field.

8. The apparatus as claimed in claim 5, wherein the memory and the computer program code are further configured to, with the processor, cause the apparatus to perform closing all connections to the device associated with the at least one address identifier.

9. A computer program product comprising computer executable program code stored in a non-transitory computer readable medium, which when executed by a processor causes an apparatus to perform:

receiving a first message from a network at a first port of a first node, the first node comprising a plurality of ports configured to be coupled to a plurality of devices, the first message comprising at least one address identifier, wherein the first message indicates that a device corresponding to the at least one address identifier was determined unreachable;

removing an association in a routing table between the at least one address identifier and the first port, the routing table comprising a list of entries, each entry associating a device with at least one of the plurality of ports and including information as to whether the associated device is of the same type as the first node; and transmitting a second message, for transmission M a communications network, only to each port of the plurality of ports which is coupled to a device of the same type as the first node, the second message comprising the at least one address identifier, wherein removing an association in a routing table between the at least one address identifier and the first port allows messages related to other addresses to continue to be communicated through the first port.

10. The computer program product as claimed in claim 9, wherein the first message is at least one of:
a control message; or
a notification message.

11. The computer program product as claimed in claim 9, wherein removing an association in a routing table between the at least one address identifier and the at least one port further comprises at least one of:
deleting the routing table entry associated with the at least one address identifier; or
amending the routing table entry associated with the at least one address identifier such that the routing table entry is a null field.

12. The computer program product as claimed in claim 9, further comprising computer executable program code stored in a non-transitory computer readable medium, which when executed by a processor causes an apparatus to perform:
closing all connections to the device associated with the at least one address identifier.

* * * * *